(12) United States Patent
Tamura

(10) Patent No.: US 12,125,378 B2
(45) Date of Patent: Oct. 22, 2024

(54) SERVER DEVICE, INFORMATION PROCESSING METHOD, INFORMATION PROCESSING PROGRAM AND STORAGE MEDIUM

(71) Applicant: PIONEER CORPORATION, Tokyo (JP)

(72) Inventor: Yuichi Tamura, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 455 days.

(21) Appl. No.: 17/426,811

(22) PCT Filed: Jan. 23, 2020

(86) PCT No.: PCT/JP2020/002225
§ 371 (c)(1),
(2) Date: Jul. 29, 2021

(87) PCT Pub. No.: WO2020/158556
PCT Pub. Date: Aug. 6, 2020

(65) Prior Publication Data
US 2022/0139211 A1    May 5, 2022

(30) Foreign Application Priority Data

Jan. 31, 2019 (JP) ................. 2019-015659

(51) Int. Cl.
*G08G 1/01* (2006.01)
*G08G 1/00* (2006.01)

(52) U.S. Cl.
CPC ......... *G08G 1/0141* (2013.01); *G08G 1/0112* (2013.01); *G08G 1/0129* (2013.01); *G08G 1/20* (2013.01)

(58) Field of Classification Search
CPC .. G08G 1/0141; G08G 1/0112; G08G 1/0129; G08G 1/20
See application file for complete search history.

(56) References Cited

U.S. PATENT DOCUMENTS

2016/0272201 A1   9/2016  Kang et al.
2016/0375912 A1  12/2016  Christensen et al.
(Continued)

FOREIGN PATENT DOCUMENTS

JP    2014-106854    6/2014
JP    2018-32333     3/2018
(Continued)

OTHER PUBLICATIONS

International Search Report for PCT/JP2020/002225, mailed Mar. 24, 2020, 4 pages.
(Continued)

*Primary Examiner* — Peter D Nolan
*Assistant Examiner* — Wae L Louie
(74) *Attorney, Agent, or Firm* — NIXON & VANDERHYE

(57) ABSTRACT

A server device capable of creating data for reflecting traveling conditions that change over time in driver assistance function, an information processing method, an information processing program, and a storage medium are provided. It includes a server communication unit configured to acquire, from a mobile object communication unit arranged at one mobile object of a plurality of mobile objects, information to be processed in which position information of the one mobile object is associated with information indicating a driver assistance function being used by the one mobile object, and a processing unit configured to execute statistical processing with respect to the information to be processed acquired by the server (Continued)

communication unit and embed, into the map data, statistical information indicating whether the driver assistance function should be performed or not in a position or area in a map indicated by the map data.

10 Claims, 8 Drawing Sheets

(56) References Cited

U.S. PATENT DOCUMENTS

| | | |
|---|---|---|
| 2017/0365166 A1 | 12/2017 | Lu et al. |
| 2018/0056992 A1 | 3/2018 | Sogen et al. |
| 2019/0163202 A1* | 5/2019 | Hatano ................ G08G 1/0112 |
| 2019/0325738 A1* | 10/2019 | Dorum ................ G08G 1/0129 |
| 2020/0126405 A1* | 4/2020 | Wette ................... G06V 40/103 |
| 2020/0182629 A1* | 6/2020 | Alawieh .............. G08G 1/0145 |
| 2020/0262438 A1* | 8/2020 | Bai ...................... G08G 1/0112 |

FOREIGN PATENT DOCUMENTS

| | | |
|---|---|---|
| JP | 2018-32334 | 3/2018 |
| WO | 2015/094228 A1 | 6/2015 |

OTHER PUBLICATIONS

Written Opinion of the ISA for PCT/JP2020/002225, mailed Mar. 24, 2020, 3 pages.
Extended European Search Report issued in European Patent Application No. 20748638.2 dated Sep. 22, 2022.

* cited by examiner

| ROAD SECTION | MANUFACTURER/DRIVER ASSISTANCE PROGRAM TYPE (311) | MOBILE OBJECT TYPE (312) | DRIVER ASSISTANCE PROGRAM VERSION (313) | STATISTICAL INFORMATION (314) |
|---|---|---|---|---|
| AREA Ar11 | MANUFACTURER A/PROGRAM A | MOBILE OBJECT TYPE A1 | Ver1.0 | ACC NOT PERMITTED |
| | | MOBILE OBJECT TYPE A1 | Ver1.5 | ACC PERMITTED |
| | | MOBILE OBJECT TYPE A2 | Ver1.0 | ACC NOT PERMITTED |
| | | MOBILE OBJECT TYPE A2 | Ver1.5 | ACC PERMITTED |
| | MANUFACTURER B/PROGRAM B | MOBILE OBJECT TYPE B1 | Ver1.0 | ACC PERMITTED |
| | | MOBILE OBJECT TYPE B1 | Ver1.3 | ACC PERMITTED |
| | | MOBILE OBJECT TYPE B2 | Ver1.0 | ACC PERMITTED |
| | | MOBILE OBJECT TYPE B2 | Ver1.3 | ACC NOT PERMITTED |
| | MANUFACTURER C/PROGRAM C | MOBILE OBJECT TYPE C1 | Ver1.0 | ACC NOT PERMITTED |
| | | MOBILE OBJECT TYPE C1 | Ver2.0 | ACC NOT PERMITTED |
| | | MOBILE OBJECT TYPE C2 | Ver1.0 | ACC NOT PERMITTED |
| | | MOBILE OBJECT TYPE C2 | Ver2.0 | ACC NOT PERMITTED |
| ... | ... | ... | ... | ... |

FIG.4

| 41 TRAVELING POSITION | 42 DRIVER ASSISTANCE FUNCTION | 43 BEHAVIOR OF MOBILE OBJECT | 44 MANUFACTURER/DRIVER ASSISTANCE PROGRAM TYPE | 45 MOBILE OBJECT TYPE | 46 DRIVER ASSISTANCE PROGRAM VERSION |
|---|---|---|---|---|---|
| POSITION Pt11 | NOT PERFORMED | NORMAL TRAVELING | MANUFACTURER A/PROGRAM A | MOBILE OBJECT TYPE A1 | Ver1.0 |
| ... | ... | ... | ... | ... | ... |
| POSITION Pt12 | ACC | NORMAL TRAVELING | MANUFACTURER A/PROGRAM A | MOBILE OBJECT TYPE A1 | Ver1.0 |
| ... | ... | ... | ... | ... | ... |
| POSITION Pt13 | ACC | NORMAL TRAVELING | MANUFACTURER A/PROGRAM A | MOBILE OBJECT TYPE A1 | Ver1.0 |
| ... | ... | ... | ... | ... | ... |
| POSITION Pt14 | ACC | SUDDEN BRAKING (MINOR INCIDENT) | MANUFACTURER A/PROGRAM A | MOBILE OBJECT TYPE A1 | Ver1.0 |
| POSITION Pt15 | ACC | NORMAL TRAVELING | MANUFACTURER A/PROGRAM A | MOBILE OBJECT TYPE A1 | Ver1.0 |
| ... | ... | ... | ... | ... | ... |
| POSITION Pt16 | ACC | SUDDEN BRAKING (DRIVING-ON-CURB ACCIDENT OCCURRED) | MANUFACTURER A/PROGRAM A | MOBILE OBJECT TYPE A1 | Ver1.0 |

| BEHAVIOR OF MOBILE OBJECT | ADDITION/SUBTRACTION VALUE OF SAFETY POINT |
|---|---|
| NORMAL TRAVELING | PLUS N11 |
| SUDDEN BRAKING (MINOR INCIDENT) | MINUS N12 |
| SUDDEN STEERING (MINOR INCIDENT) | MINUS N13 |
| SUDDEN BRAKING (DRIVING-ON-CURB ACCIDENT OCCURRED) | MINUS N14 |
| ⋮ | ⋮ |

| ROAD SECTION 61 | DRIVER ASSISTANCE FUNCTION 62 | MANUFACTURER/DRIVER ASSISTANCE PROGRAM TYPE 63 | MOBILE OBJECT TYPE 64 | DRIVER ASSISTANCE PROGRAM VERSION 65 | ACCUMULATED VALUE OF SAFETY EVALUATION DURING PREDEFINED PERIOD OF TIME 66 | EQUAL TO OR GREATER THAN THRESHOLD ? 67 |
|---|---|---|---|---|---|---|
| AREA Ar11 | ACC | MANUFACTURER A/PROGRAM A | MOBILE OBJECT TYPE A1 | Ver1.0 | Cn11 | NO |
| | ACC | MANUFACTURER A/PROGRAM A | MOBILE OBJECT TYPE A1 | Ver1.5 | Cn12 | YES |
| | ACC | MANUFACTURER A/PROGRAM A | MOBILE OBJECT TYPE A2 | Ver1.0 | Cn13 | NO |
| | ACC | MANUFACTURER A/PROGRAM A | MOBILE OBJECT TYPE A2 | Ver1.5 | Cn14 | YES |
| | ACC | MANUFACTURER B/PROGRAM B | MOBILE OBJECT TYPE B1 | Ver1.0 | Cn15 | YES |
| ROAD LINK L11 | ACC | MANUFACTURER A/PROGRAM A | MOBILE OBJECT TYPE A1 | Ver1.0 | Cn16 | NO |
| ... | ... | ... | ... | ... | ... | ... |

SERVER DEVICE, INFORMATION PROCESSING METHOD, INFORMATION PROCESSING PROGRAM AND STORAGE MEDIUM

This application is the U.S. national phase of International Application No. PCT/JP2020/002225 filed 23 Jan. 2020, which designated the U.S. and claims priority to JP Patent Application No. 2019-015659 filed 31 Jan. 2019, the entire contents of each of which are hereby incorporated by reference.

BACKGROUND OF THE INVENTION

Field of the Invention

The present invention relates to a server device, an information processing method, an information processing program and a storage medium in which the information processing program is stored, for creating data related to driver assistance function for a mobile object.

Description of the Related Art

Conventionally, driver assistance technologies for assisting driving operations of a mobile object such as a steering wheel operation, acceleration and deceleration are known (see Patent Document 1, for example). As for the driver assistance, there are various techniques such as assisting one or more of the steering wheel operation, acceleration and deceleration.

CITATION LIST

Patent Document

Patent Document 1: JP 2014-106854 A

With regard to the driver assistance, there are various cases such as the case where it can be performed without any trouble or the case where it is desirable to drive only by manual operation, etc., depending on traveling conditions related to a road, a surrounding environment and the like. Thus, it is desired to perform an appropriate driver assistance in which the traveling conditions are reflected. The traveling conditions affecting the driver assistance may change over time, for example due to a road construction or a surrounding building construction or the like. However, there has not yet been proposed an effective way to appropriately reflect the traveling conditions that change over time in the driver assistance.

Accordingly, one example of the problem to be solved by the present invention is to provide a server device, an information processing method, an information processing program and a storage medium capable of creating data for reflecting traveling conditions that change over time in driver assistance.

SUMMARY OF THE INVENTION

In order to solve the problem mentioned above and achieve the object, a server device of the present invention is configured to execute statistical processing with respect to data acquired from a communication device arranged at each of a plurality of mobile objects and embed information into map data, and the server device includes, an acquisition unit configured to acquire, from the communication device arranged at one mobile object of the plurality of mobile objects, information to be processed in which position information of the one mobile object is associated with information indicating a driver assistance function being used by the one mobile object, and a processing unit configured to execute statistical processing with respect to the information to be processed acquired by the acquisition unit and embed, into the map data, statistical information indicating whether the driver assistance function should be performed or not, or whether the driver assistance function should not be performed or not, in a position or area in a map indicated by the map data.

Further, in order to solve the problem mentioned above and achieve the object, the present invention provides an information processing method for performing statistical processing with respect to data acquired from a communication device arranged at each of a plurality of mobile objects and embedding information into map data, the method including: an acquiring step of acquiring, from the communication device arranged at one mobile object of the plurality of mobile objects, information to be processed in which position information of the one mobile object is associated with information indicating a driver assistance function being used by the one mobile object; and a processing step of executing statistical processing with respect to the information to be processed acquired in the acquiring step and embedding, into the map data, statistical information indicating whether the driver assistance function should be performed or not, or whether the driver assistance function should not be performed or not, in a position or area in a map indicated by the map data.

Further, in order to solve the problem mentioned above and achieve the object, the present invention provides an information processing program that causes a computer to execute the information processing method described above.

Further, in order to solve the problem mentioned above and achieve the object, a storage medium of the present invention stores therein the information processing program described above.

BRIEF DESCRIPTION OF THE DRAWINGS

FIG. 4 shows, in a table format, embedded information shown in FIG. 3;

FIG. 6 shows, in a table format, a data structure of data sent to the server by repeating the processing of the information processing method represented by the flowchart of FIG. 5;

FIG. 9 shows, in a table format, one example of evaluation results when the statistical safety evaluation is performed with respect to the driver assistance functions based on accumulated values of safety point.

DESCRIPTION OF THE PREFERRED EMBODIMENTS

Figure 1:
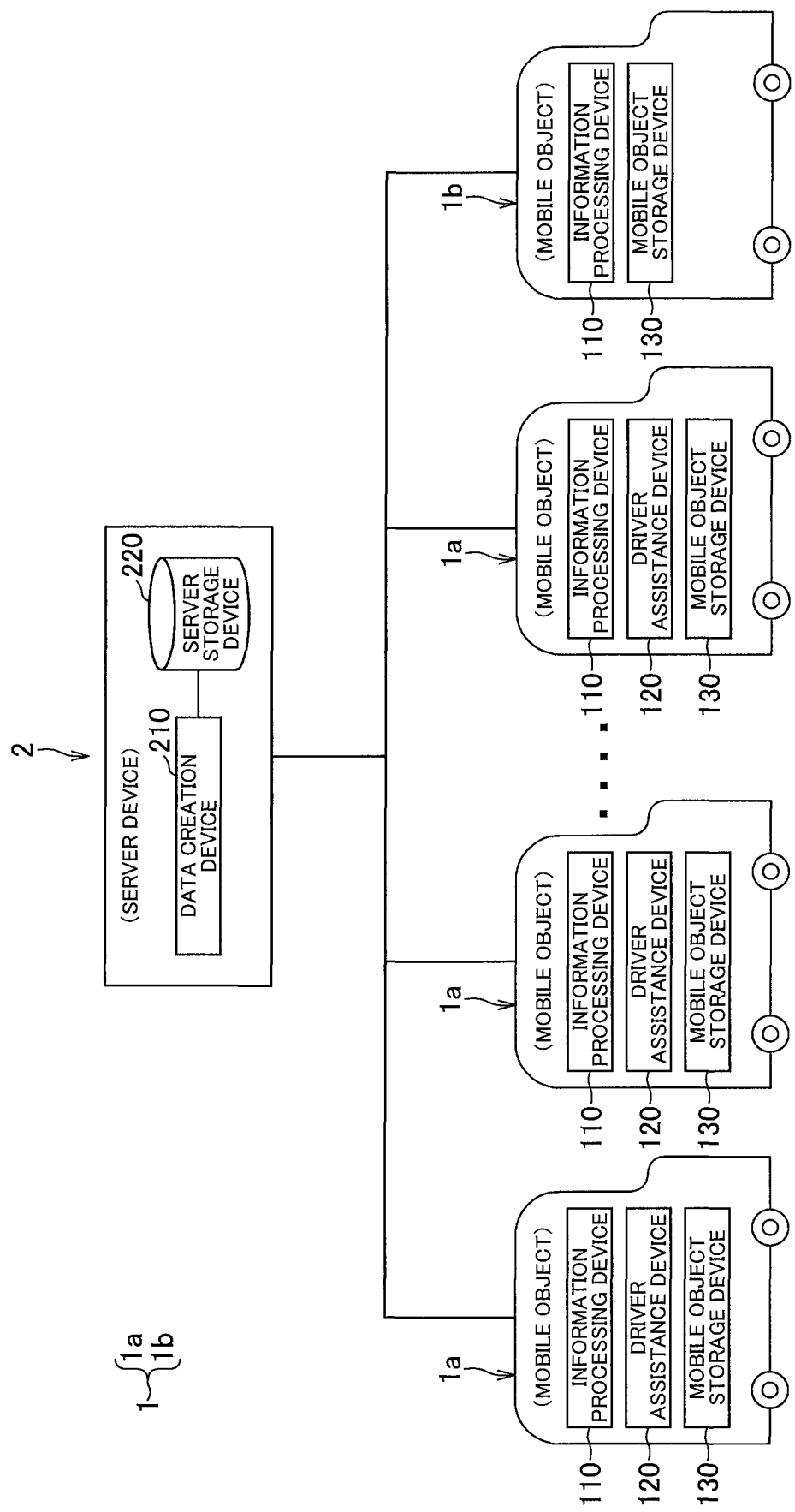
FIG. 1 is a schematic diagram showing a plurality of mobile objects and a server.

In the following, an embodiment of the present invention is described. A server device according to an embodiment of the present invention executes statistical processing with respect to data acquired from a communication device arranged at each of a plurality of mobile objects and embeds information into map data, and the server device includes an acquisition unit and a processing unit. The acquisition unit acquires, from the communication device arranged at one mobile object of the plurality of mobile objects, information to be processed in which position information of the one mobile object is associated with information indicating a driver assistance function being used by the one mobile object. The processing unit executes statistical processing with respect to the information to be processed acquired by the acquisition unit and embeds, into the map data, statistical information indicating whether the driver assistance function should be performed or not, or whether the driver assistance function should not be performed or not, in a position or area in a map indicated by the map data.

According to the server device of this embodiment, the statistical processing is executed based on the position information and the information indicating the driver assistance function acquired from one mobile object, and the statistical information is embedded in the position or area in the map, the statistical information indicating whether the driver assistance function should be performed or not, or whether the driver assistance function should not be performed or not. The position information and the information indicating the driver assistance function of the mobile object represent how the driver assistance function was actually performed in an arbitrary traveling position in accordance with traveling conditions that change over time due to a road construction or a surrounding building construction or the like, for example. Using this information, the statistical information indicating whether the driver assistance function should be performed or not, or whether the driver assistance function should not be performed or not, is embedded in the position or area in the map, thus the traveling conditions that change over time can be reflected in the driver assistance function.

In this embodiment, the acquisition unit is configured to acquire, as the information to be processed, information in which information indicating behavior of the one mobile object is associated with the position information and the information indicating the driver assistance function.

The behavior of the mobile object being subjected to the driver assistance function briefly represents an influence of the traveling conditions that change over time due to a road construction or a surrounding building construction or the like on the driver assistance function of the mobile object. According to this embodiment, since this behavior of the mobile object is also used when embedding the statistical information, the traveling conditions that change over time can be meticulously reflected in the driver assistance function.

Further, in this embodiment, the processing unit determines, based on the information indicating the behavior of the mobile object, whether traveling can be performed safely by performing the driver assistance function or not in the position or area in the map and produces the statistical information.

According to this embodiment, since the safety of the driver assistance function determined based on the behavior of the mobile object is reflected in the production of the statistical information described above, the traveling conditions that change over time can be meticulously reflected in the driver assistance function from the safety point of view.

Further, in this embodiment, the acquisition unit acquires, as the information to be processed, information in which following information is associated with the position information and the information indicating the driver assistance function. That is, the acquisition unit acquires information in which at least one of information regarding a type of a program related to the driver assistance function, information regarding a version of the program, or information regarding a type of the one mobile object is associated with the position information and the information indicating the driver assistance function.

The type of the program related to this driver assistance function, the version of the program and/or the type of the mobile object may differ even when the driver assistance function is the same. According to this embodiment, this information is also used to produce the statistical information, thus the traveling conditions that change over time can be meticulously reflected in the driver assistance function.

Further, the server device of this embodiment includes a supply unit configured to supply the statistical information produced by the processing unit to a predefined mobile object.

According to this embodiment, since the produced statistical information is supplied to the mobile object, the traveling conditions that change over time can be effectively reflected in the driver assistance function in that mobile object.

Further, an information processing method according to an embodiment of the present invention is an information processing method for performing statistical processing with respect to data acquired from a communication device arranged at each of a plurality of mobile objects and embedding information into map data, and the method includes an acquiring step and a processing step. The acquiring step is a step of acquiring, from the communication device arranged at one mobile object of the plurality of mobile objects, information to be processed in which position information of the one mobile object is associated with information indicating a driver assistance function being used by the one mobile object. The processing step is a step of executing statistical processing with respect to the information to be processed acquired in the acquiring step and embedding, into the map data, statistical information indicating whether the driver assistance function should be performed or not, or whether the driver assistance function should not be performed or not, in a position or area in a map indicated by the map data.

According to the information processing method of this embodiment, the statistical processing is executed based on the position information and the information indicating the driver assistance function acquired from one mobile object, and the statistical information indicating whether the driver assistance function should be performed or not, or whether the driver assistance function should not be performed or not, is embedded in a position or area in the map. The position information and the information indicating the driver assistance function of the mobile object represent that, in what degree the driver assistance function was actually performed in an arbitrary traveling position in accordance with the traveling conditions that change over time due to a road construction or a surrounding building construction or the like, for example. Using this information, the statistical information indicating whether the driver assistance function should be performed or not, or whether the driver assistance function should not be performed or not, is embedded in the position or area in the map, thus the traveling conditions that change over time can be reflected in the driver assistance function.

Further, an information processing program according to an embodiment of the present invention causes a computer to execute the information processing method described above.

According to the information processing program of this embodiment, by causing the computer to execute the information processing method described above, the traveling conditions that change over time can be reflected in the driver assistance function.

Further, a storage medium according to an embodiment of the present invention is a storage medium in which the information processing program described above is stored.

According to the storage medium of this embodiment, the information processing program stored therein enables the information processing method described above to be executed by the computer. Consequently, the traveling conditions that change over time can be reflected in the driver assistance function.

EXAMPLE

In the following, an example for solving the problem of reflecting traveling conditions that change over time in driver assistance function, or the problem of providing a meticulous driver assistance function, will be described in detail with reference to the drawings.

Figure 2:
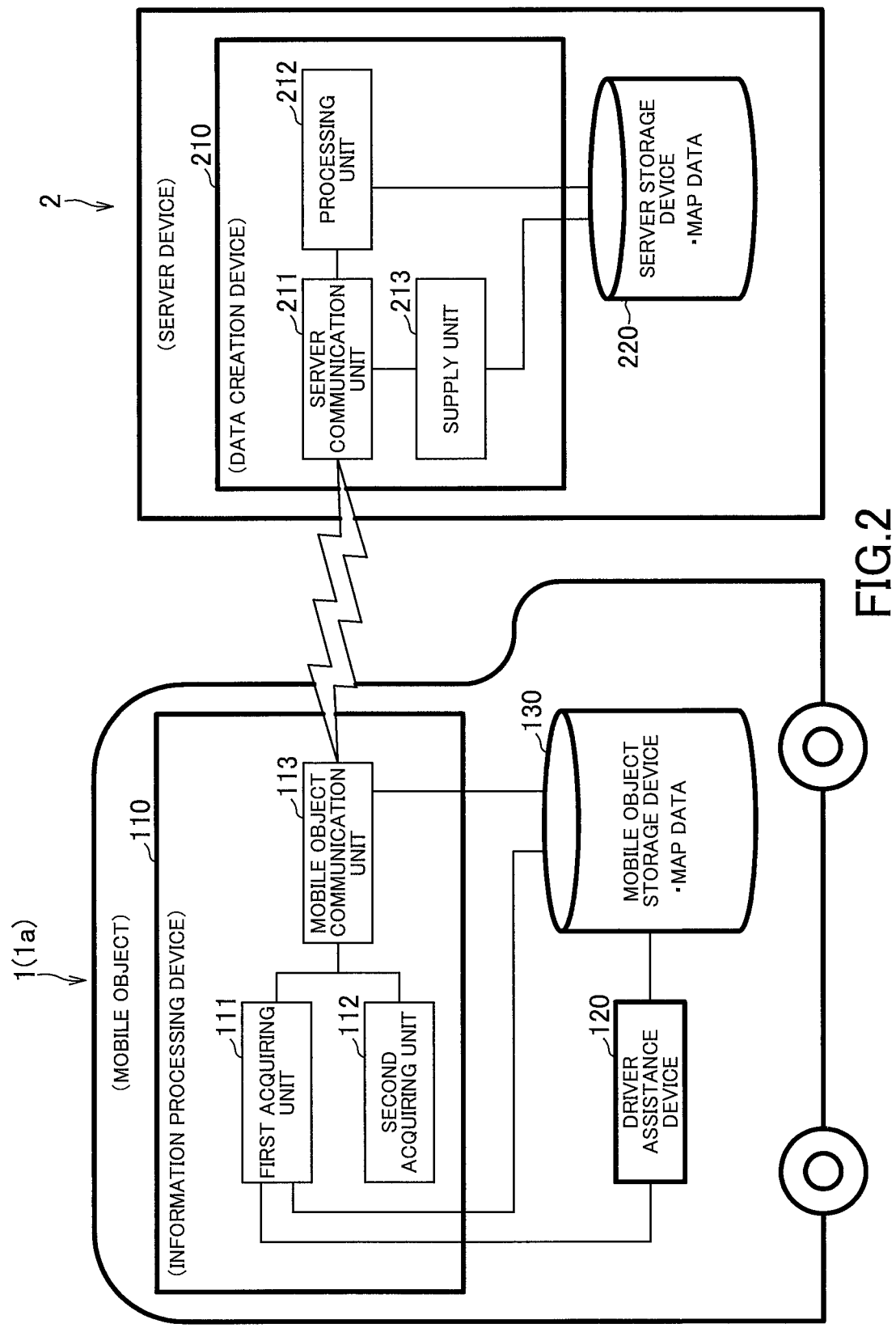
FIG. 2 is a schematic block diagram showing respective device configurations in the mobile object and the server shown in FIG. 1.

FIG. 1 is a schematic diagram showing a plurality of mobile objects and a server, and FIG. 2 is a schematic block diagram showing respective device configurations in the mobile object and the server shown in FIG. 1.

In this example, a plurality of mobile objects 1, each of which is a passenger car, is wirelessly connected to one server device 2, as shown in FIG. 1. The server device 2 is provided with a server storage device 220 which stores map data used to determine whether to perform driving using a driver assistance function in each mobile object 1 or not, i.e., to permit or not to permit the driver assistance function. The server device 2 is also provided with a data creation device 210 which creates map data to be stored in the server storage device 220.

On the other hand, each mobile object 1 is provided with an information processing device 110 configured to perform information processing related to the driver assistance function. In this example, the plurality of mobile objects 1 includes a mobile object 1a capable of performing the driver assistance function and including a driver assistance device 120 configured to perform the driver assistance function, and a mobile object 1b not capable of performing the driver assistance function and not including the driver assistance device 120.

Further, each mobile object 1 includes a mobile object storage device 130. In the mobile object 1a capable of performing the driver assistance function, map data used for the driver assistance function by the driver assistance device 120 is stored in the mobile object storage device 130. This map data is the map data that is stored in the server storage device 220 described above and that is provided from the server device 2 as appropriate. Various kinds of information described later used to perform the information processing in the information processing device 110 are also stored in the mobile object storage device 130.

The information processing device 110 is a device configured to acquire information for creating map data in the server device 2.

In this example, components of the information processing device 110 and of the driver assistance device 120 are built in a navigation device arranged in the mobile object 1, except for a part thereof. The driver assistance device 120 is constituted of components built in this navigational device and of various sensors not shown.

Before explaining each component of the information processing device 110 of the mobile object 1 and of the data creation device 210 of the server device 2, a data structure of the map data stored in the server storage device 220 will be described.

Figure 3:
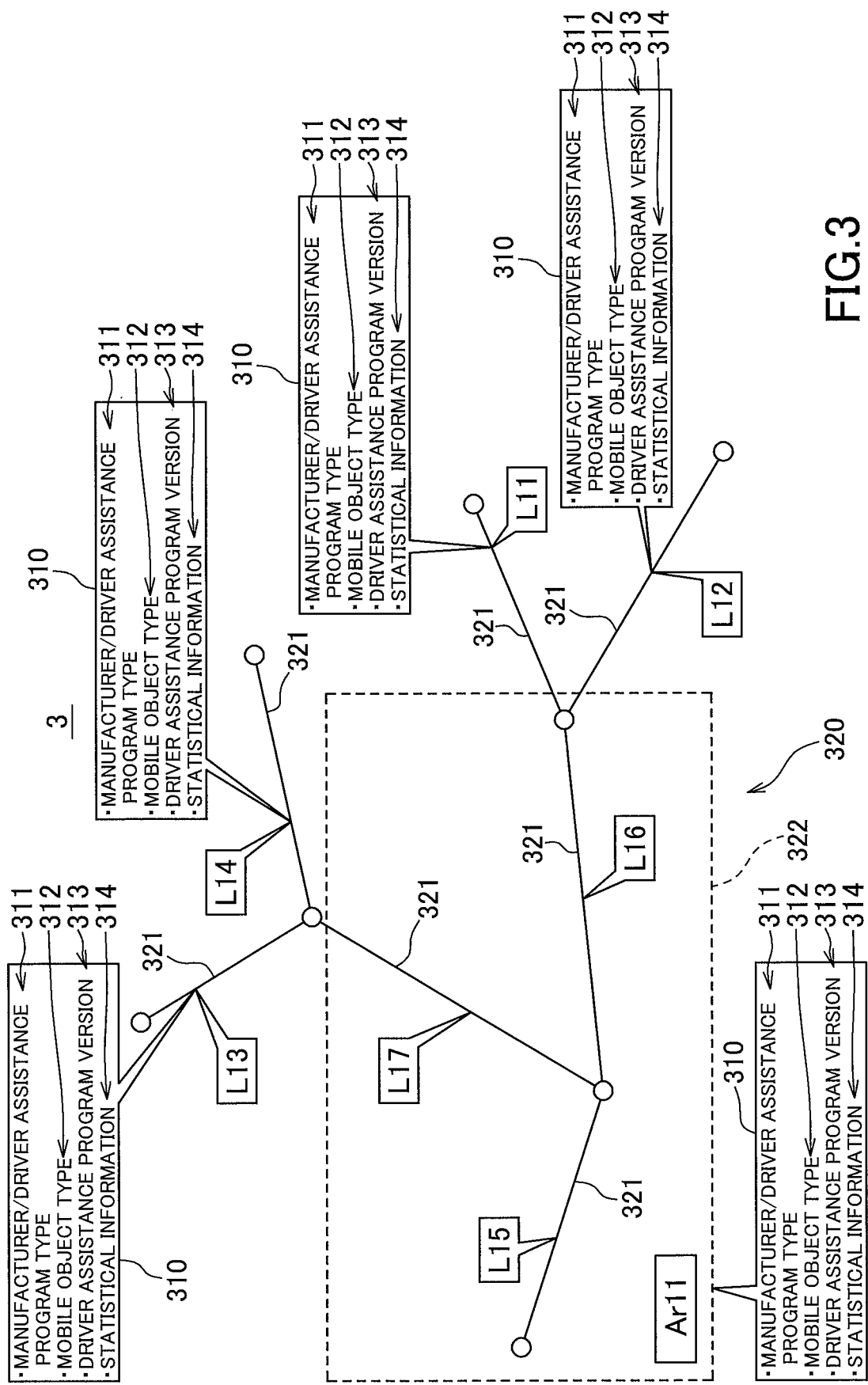
FIG. 3 is a schematic diagram showing a data structure of map data stored in a server storage device shown in FIG. 2.

FIG. 3 is a schematic diagram illustrating a data structure of the map data stored in the server storage device shown in FIG. 2.

A data structure 3 shown in FIG. 3 includes embedded information 310 described below. The embedded information 310 is information regarding the driver assistance function in the mobile object 1 and includes statistical information 314 statistically indicating whether to perform a driver assistance function or not (i.e., to permit/not to permit the driver assistance function) in a position or an area on a predefined map. In the data structure 3, this embedded information 310 is associated with a position or an area on the map. The position or the area on the map is a road link 321 constituting a road network 320 and/or an area 322 including the plurality of road links 321.

FIG. 4 is a diagram showing, in a table format, the embedded information shown in FIG. 3 for an area Ar11 for example.

The embedded information 310 in this data structure 3 is information including manufacturer/driver assistance function program type information 311, mobile object type information 312, driver assistance function program version information 313, and statistical information 314.

The manufacturer/driver assistance function program type information 311 is information regarding the type of the driver assistance function program related to the driver assistance function included in the mobile object 1 and a manufacturer of the driver assistance function program of the mobile object 1. The driver assistance function as described herein includes an ACC (Adaptive Cruise Control) function, an LKAS (Lane Keeping Assist System) function, and an auto-braking function and such. The ACC function among these functions is shown in FIG. 4. The ACC function is a function to allow traveling while keeping a constant inter-vehicular distance from a mobile object traveling in the front. The LKAS function is a function to allow traveling while keeping a vehicle lane.

The mobile object type information 312 is information regarding the type (vehicle type) of the mobile object 1.

The driver assistance function program version information 313 is information regarding the version of the driver assistance function program included in the mobile object 1.

The statistical information 314 is information indicating whether to perform driving using the driver assistance function or not (i.e., to permit/not to permit the driver assistance function), as described above.

In the example of FIG. 4, as the manufacturer/driver assistance function program type information 311, there are shown three kinds of information regarding the program, namely, an A program by a manufacturer A, a B program by a manufacturer B, and a C program by a manufacturer C.

Further, as the mobile object type information 312, there are shown six kinds of information regarding the type, namely, mobile object types A1, A2 by the manufacturer A, mobile object types B1, B2 by the manufacturer B, and mobile object types C1, C2 by the manufacturer C. Further, as the driver assistance function program version information 313, there are shown information regarding the version, namely, Ver. 1.0 and Ver. 1.5 for the program A, Ver. 1.0 and Ver. 1.3 for the program B, and Ver. 1.0 and Ver. 2.0 for the program C.

Further, as the statistical information 314, there are shown that, for the program A by the manufacturer A included in the mobile object type A1 by the manufacturer A, the use of the ACC function is not permitted for Ver. 1.0, but the use of the ACC function is permitted for Ver. 1.5. Similarly, for the program A by the manufacturer A included in the mobile object type A2, the use of the ACC function is not permitted for Ver. 1.0, but the use of the ACC function is permitted for Ver. 1.5. For the program B by the manufacturer B included in the mobile object type B1 by the manufacturer B, it is shown that the use of the ACC function is not permitted for both of Ver. 1.0 and Ver. 1.3. Further, for the program C by the manufacturer C included in the mobile object type C1 by the manufacturer C, it is shown that that the use of the ACC function is permitted for both of Ver. 1.0 and Ver. 2.0.

In the example of FIG. 4, the embedded information 310 including the above-described information is embedded in the map data in a form of the data structure 3 associated with the area Ar11.

In the server device 2, the map data including the data structure 3 described above is created by the data creation device 210 and stored in the server storage device 220. The server storage device 220 is a hard disk device as a storage device provided in the server device 2. Herein, the storage for storing data described above is not limited to the hard disk device, it may be other storage devices that are writable/readable or may be a well-known portable storage medium. In the case where the data is stored in the portable storage medium, the server storage device 220 described above is a reader/writer device in which the portable storage medium can be installed and removed.

The map data of the server storage device 220 is supplied to the mobile object 1 as appropriate. In the mobile object 1, the map data supplied from the server device 2 is stored in the mobile object storage device 130 and is read out by the driver assistance device 120 and used for the driver assistance function. The mobile object storage device 130 is a hard disk device as a storage device provided in the mobile object 1. Herein, the storage for storing data described above is not limited to the hard disk device, it may be other storage devices that are writable/readable or may be a well-known portable storage medium. In the case where the data is stored in the portable storage medium, the mobile object storage device 130 described above is a reader/writer device in which the portable storage medium can be installed and removed.

To create the map data to be stored in the storage devices as described above, the mobile object 1 is provided with the information processing device 110, and the server device 2 is provided with the data creation device 210, as shown in FIG. 2.

First, the information processing device 110 of the mobile object 1 will be described. The information processing device 110 is a device for acquiring information for creating the map data having the data structure 3 in the server device 2, and includes a first acquiring unit 111, a second acquiring unit 112, and a mobile object communication unit 113. With these components, the information processing device 110 acquires information according to a processing flow of the following information processing method.

Figure 5:
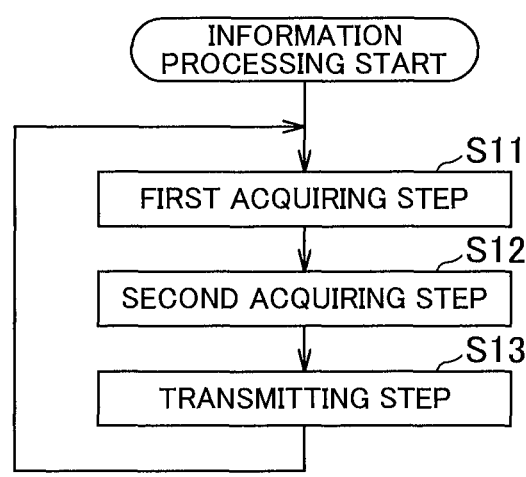
FIG. 5 is a flowchart illustrating a processing flow of an information processing method performed in an information processing device shown in FIG. 2.

FIG. 5 is a flowchart illustrating a processing flow of the information processing method performed in the information processing device shown in FIG. 2.

The processing represented by this flowchart starts when a navigation device of the mobile object 1 is powered on and runs in parallel with a normal navigation processing.

Once the processing is started, firstly, the first acquiring unit 111 executes a first acquiring step (step S11) of acquiring, from the driver assistance device 120, the information regarding the driver assistance function that is being performed in the mobile object 1. The information acquired in this step also includes that manual operation is being performed and the driver assistance function is not being performed, if this is the case.

In this example, in the first acquiring step (Step S11), the first acquiring unit 111 also acquires the following information regarding the mobile object 1 provided with the information processing device 110 that is executing the information processing method of this flowchart. That is, the first acquiring unit 111 reads out and acquires, from the mobile object storage device 130, information regarding each of the manufacturer of the driver assistance function program included in the mobile object 1, the manufacturer of the mobile object 1, the type and the version of the driver assistance function program, and the type of the mobile object 1.

Further, in this example, in the first acquiring step (step S11), the first acquiring unit 111 acquires the behavior of the mobile object 1 from a braking device and a steering wheel device and the like of the mobile object 1.

Subsequent to the first acquiring step (Step S11) described above, the second acquiring unit 112 executes a second acquiring step (Step S12) of acquiring a traveling position of the mobile object 1. The second acquiring unit 112 acquires the traveling position of the mobile object 1 using a positioning system such as GNSS (Global Navigation Satellite System).

Once these various kinds of information are acquired in a manner as described above, the mobile object communication unit 113 executes a transmitting step (step S13). The mobile object communication unit 113 transmits, to the server device 2, information regarding each of the driver assistance function that is being performed, the manufacturer of the driver assistance function program, the manufacturer of the mobile object 1, the type and the version of the driver assistance function program, the type, the traveling position and the behavior of the mobile object 1, along with associating them with each other. Once the transmitting step (step S13) is completed, the processing returns to step S11 and the subsequent processing is repeated.

The processing of the information processing method represented in the flowchart of FIG. 5 is continuously executed until the navigational device is powered off.

The information processing program that causes a computer to execute the information processing method represented by the flowchart of FIG. 5 is stored in a storage medium of the navigation device or in a storage medium of an in-vehicle computer device separate from the navigation device. The storage medium for storing this information processing program is not limited to the storage medium of these devices, it may be a well-known portable storage medium or a storage medium installed in a server connected to these devices via a network.

By repeating the processing of the information processing method represented by the flowchart of FIG. 5, data having a data structure as described below is transmitted to the server device 2.

FIG. 6 is a diagram showing, in a table format, the data structure of the data to be sent to the server by repeating the processing of the information processing method represented by the flowchart of FIG. 5.

In a data structure 4 shown in FIG. 6, the following six kinds of information are associated with each other. That is, the six kinds of information include position information 41 indicating the traveling position of the mobile object 1, driver assistance function information 42 indicating the driver assistance function being performed, and behavior information 43 indicating the behavior of the mobile object 1. Further, manufacturer/driver assistance function program type information 44 indicating a manufacturer of the driver assistance function program and of the mobile object 1 and the type of the driver assistance function program, mobile object type information 45 indicating the type of the mobile object 1, version information 46 indicating the version of the driver assistance function program, are included. An information set 47 consisting of the six kinds of information described above is transmitted to the server device 2 by the mobile object communication unit 113, one set on each cycle of execution of the processing of the information processing method represented by the flowchart of FIG. 5.

In the example of FIG. 6, firstly, the information set 47 is transmitted that indicates the mobile object 1 which has the mobile object type A1, has the program A with Ver. 1.0 and by the manufacturer A is normally traveling without performing the driver assistance function in a position Pt11. After continuation of the transmission of the similar information sets 47, the ACC function is activated in a position Pt12, and the information set 47 is transmitted that indicates that normal traveling is being performed under the ACC function at a location Pt12. Then, in the example of FIG. 6, after continuation of the normal traveling under the ACC function in a section including a position Pt13, the information set 47 is transmitted that indicates that sudden braking as a low degree hazardous behavior corresponding to a so-called minor incident has occurred in a position Pt14. From a position Pt15 corresponding to the next cycle, the transmission of the information set 47 indicating the normal traveling is continued, but once it has reached to a position Pt16, the information set 47 is transmitted that indicates that sudden braking as a high degree hazardous behavior associated with occurrence of a driving-on-curb accident has occurred. The mobile object 1 stops at this point, and the transmission of the information set 47 is also stopped at this point.

Although FIG. 6 is only an example of the transmission of the data having the data structure 4, such a series of data transmissions is performed for each of the plurality of mobile objects 1 shown in FIG. 2, and the data creation device 210 of the server device 2 creates map data based on the data from each mobile object 1.

Next, the data creation device 210 of the server device 2 will be described. The data creation device 210 is configured to create map data having the data structure 3 shown in FIG. 3 and FIG. 4 based on the information from the mobile object 1, and includes a server communication unit 211 (acquisition unit), a processing unit 212 and a supply unit 213, as shown in FIG. 2. With these components, the data creation device 210 creates map data according to a processing flow of the information processing method described below.

Figures 7, 8:
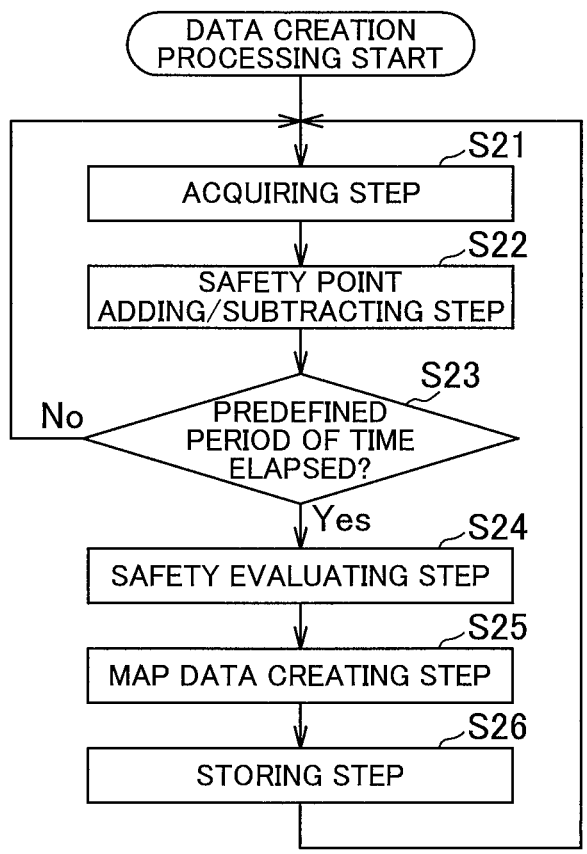
FIG. 7 is a flowchart illustrating a processing flow of the information processing method performed in the server shown in FIG. 2.
FIG. 8 is a diagram showing an evaluation table in which various behaviors of the mobile object are associated with an addition/subtraction value of a safety point for evaluating safety of driver assistance functions.

FIG. 7 is a flowchart showing a processing flow of the information processing method performed in the server device shown in FIG. 2.

This processing starts once the server device 2 is powered on. Firstly, the server communication unit 211 executes an acquiring step (Step S21) of acquiring information to be processed in which the position information 41 indicating the traveling position and the driver assistance function information 42 and the like are associated with each other, for one mobile object 1 of the plurality of mobile objects 1. In this acquiring step (Step S21), the information set 47 corresponding to one row of the table shown in FIG. 6 is acquired from the mobile object 1 as information to be processed. That is, the position information 41 of the one mobile object 1, the driver assistance function information 42, the behavior information 43, the manufacturer/driver assistance function program type information 44, the mobile object type information 45 and the version information 46 for one mobile body 1 are acquired as the information to be processed.

Next, based on the acquired information set 47, the processing unit 212 executes a safety point adding/subtracting step (step S22) as described below. That is, the safety point adding/subtracting step (step S22) is a step of adding or subtracting the safety point for evaluating the safety of the driver assistance function as an evaluation target that is associated with a position or area on the map in which the position information 41 of the mobile object 1 in the information set 47 belongs. The addition/subtraction value of the safety point is determine based on the behavior information 43 of the mobile object 1 in the information set 47 using an evaluation table as described below.

FIG. 8 shows an evaluation table in which various behaviors of the mobile object are associated with the addition/subtraction values of the safety point for evaluating the safety of the driver assistance function.

In an evaluation table 5 shown in FIG. 8, the normal traveling is associated with the addition/subtraction value that is plus N11, and the sudden braking as a low degree hazardous behavior corresponding to a minor incident is associated with the addition/subtraction value that is minus N12. Further, sudden steering as a low degree hazardous behavior is associated with the addition/subtraction value that is minus N13 which is comparable with the above-described minus N12. Further, sudden braking as a high degree hazardous behavior in the event of a driving-on-curb accident is associated with the addition/subtraction value that is minus N14 having an absolute value larger than that of minus N12 and minus N13. The evaluation table 5 is stored in the server storage device 220 shown in FIG. 2.

In the safety point adding/subtracting step (step S22) of FIG. 7, the processing unit 212 refers to the evaluation table 5 described above and obtains the addition/subtraction value of the safety point associated with the behavior of the mobile object 1 indicated by the behavior information 43 in the acquired information set 47. Then, using the obtained addition/subtraction value, the processing unit 212 adds or subtracts the safety point for the position or area on the map in which the position information 41 in the information set 47 belongs, by associating it with the driver assistance function as an evaluation target.

After the acquiring step (step S21) and the safety point adding/subtracting step (step S22) are executed for one information set 47, the processing unit 212 determines whether these two steps have been executed for a predefined period of time or not (step S23). If they have been only executed for a period of time less than the predefined period of time ("NO" in step S23), then the processing returns to step S21 and the subsequent processing is repeated. By this repetition, the safety point for the driver assistance function, etc., is accumulated for the position or area on the map. When the above two steps are executed for the predefined period of time (YES in step S23), the processing unit 212 executes a safety evaluating step (step S24) as described below. The safety evaluating step (step S24) is a step of performing statistical safety evaluation for the driver assistance function based on the accumulated value of the safety point with respect to the position or area on the map.

FIG. 9 shows, in a table format, one example of evaluation results when the statistical safety is evaluated for the driver assistance function based on the accumulated value of the safety point.

In an evaluation result table 6 shown in FIG. 9 as one example, the evaluation results obtained when the statistical safety is evaluated for a driver assistance function 62 for a position or area 61 on the map, are shown for the area Ar11 on the map shown in FIG. 3 for example. In this evaluation, when one information set 47 is firstly acquired from one mobile object 1, the position or area 61 in which the position information 41 in the information set 47 belongs is obtained. Herein, it is assumed that this position information 41 belongs to the area Ar11.

Next, it is determined whether the driver assistance function information 42, the manufacturer/driver assistance function program type information 44, the mobile object type information 45 and the version information 46 in the information set 47 are already associated with the area Ar11, as the driver assistance function information 62, manufacturer/driver assistance function program type information 63, mobile object type information 64 and version information 65 as evaluation targets. If they are not associated, then each of the above-mentioned information in the information set 47 is associated with the area Ar11 as the evaluation targets. Further, the addition/subtraction value of the safety point obtained based on the behavior information 43 in the information set 47 is associated with the area Ar11 as an initial value of the safety point.

On the other hand, if each of the above-mentioned information in the information set 47 is already associated with the area Ar11 as the evaluation target, then the safety point adding/subtracting step (step S22) is executed as follows. Firstly, based on the behavior information 43 of the mobile object 1 in the information set 47, the addition/subtraction value of the safety point is obtained. Next, the obtained addition/subtraction value is added to or subtracted from the safety point that is already associated with the area Ar11 together with the above-described evaluation targets.

The above-described processing is executed every time the information set 47 is acquired from one mobile object 1 of the plurality of mobile objects 1 for a predefined period of time, and the safety point is accumulated.

Then, after the predefined period of time has elapsed, the processing unit 212 compares, with a predefined threshold value, an accumulated value 66 of the safety point that is associated, together with the respective information as the evaluation target, with the position or area 61 on the map as the evaluation target. If it is equal to or greater than the threshold value, then the evaluation result 67 is that, it is statistically safe to perform the driver assistance function as an evaluation target, with respect to the manufacturer, the driver assistance function program type, the mobile object type and the version as the evaluation targets, in that position or area (herein, the area Ar11) 61.

In the example of FIG. 9, with respect to the area Ar11, it is evaluated that the driver assistance function using the ACC function should not be performed (is not permitted) for the manufacturer, the driver assistance function program type, the mobile object type and the version corresponding to the safety point accumulated values Cn11 and Cn13. On the other hand, it is evaluated that the driver assistance function using the ACC function should be performed (is permitted) for the manufacturer, the driver assistance function program type, the mobile object type and the version corresponding to the safety point accumulated values Cn12, Cn14 and Cn15.

In the safety evaluating step (step S24) in the flowchart of FIG. 7, when the evaluation such as the one shown in FIG. 9 is performed, the processing unit 212 executes a map data creating step (step S25) based on the evaluation results. In the map data creating step (step S25), the embedded information 310 (FIG. 3 and FIG. 4) including the evaluation results as the statistical information 314 is created for each position or area on the map such as the area Ar11 or a road link L11. The created embedded information 310 is again associated with the position or area corresponding to the evaluation result and is thereby embedded in the map data of the data structure 3 shown in FIG. 3.

Subsequently, the processing unit 212 executes a storing step (step S26) of storing the map data created by the above-described embedding, in the server storage device 220. After the storing step (step S26), the processing returns to step S21 and the subsequent processing is repeated. By this repetition, each time a predefined period of time elapses, the safety point is accumulated based on the information set 47 acquired from each mobile object 1 of the plurality of mobile objects 1 during that period of time, and the map data is created and stored based on the evaluation results of the accumulated values 66. That is, the map data of the server storage device 220 is updated for every predefined period of time by the processing of the information processing method according to the flowchart of FIG. 7. This map data is supplied to the mobile object 1 as appropriate by the supply unit 213 and will be referenced in the determination of the driver assistance function in that mobile object 1 to which the map data is supplied.

In this example, the processing of the information processing method represented by the flowchart of FIG. 7 continues to be executed until the server is powered off.

In this example, an information processing program that causes a computer to execute the information processing method represented by the flowchart of FIG. 7 is stored in a storage medium that forms a part of the server storage device 220 or a storage medium that is separate from the server storage device 220. The storage medium for storing the information processing program is not limited to a storage medium installed in the server device 2, it may be a well-known portable storage medium or a storage medium installed in another server connected to the server device 2 via a network.

According to the example described above, the following advantageous effect can be provided. First, according to the information processing device 110 shown in FIG. 1 and FIG. 2, the information processing method represented by the flowchart of FIG. 5, the information processing program and the storage medium, the following processing is performed. That is, the information set 47 in which the driver assistance function information 42 and the position information 41 in the mobile object 1 are associated with each other is transmitted to the server device 2. The driver assistance function information 42 and the position information 41 in the mobile object 1 represent how the driver assistance function was actually performed in an arbitrary traveling position in accordance with traveling conditions that change over time due to a road construction or a surrounding building construction or the like, for example. The information set 47 is transmitted from the mobile object 1 to the server device 2 and is supplied to create the embedded information 310 which includes the statistical information 314 indicating whether to perform the driver assistance function or not (to permit/not to permit the driver assistance function) and which corresponds to a position or area on a predefined map, thus the traveling conditions that change over time can be reflected in the driver assistance function.

In this example, as shown in FIG. 6 as one example, the following information is acquired together with the driver assistance function information 42. That is, the manufacturer/driver assistance function program type information 44, the mobile object type information 45 and the version information 46 are acquired. Then, the information described above is further associated with the driver assistance function information 42 and the position information 41 and transmitted.

Even when the driver assistance function that is being performed is the same, the manufacturer of the mobile object 1 and of the driver assistance function program, the type of the driver assistance function program, the type of the mobile object 1 and the version of the driver assistance function program and the like related to that driver assistance function may differ. According to this example, the information described above is also transmitted to the server device 2 and supplied to create the embedded information 310, thus the traveling conditions that change over time can be meticulously reflected in the driver assistance function.

Herein, the information that is acquired by the mobile object 1, further associated with the driver assistance function information 42 and the position information 41 and transmitted to the server device 2 may include at least one of the manufacturer/driver assistance function program type information 44, the mobile object type information 45 and the version information 46. That is, the information as described above may be any one or more of these, or may include another information, unlike this example.

Further, in this example, the behavior information 43 of the mobile object 1 is acquired together with the driver assistance function information 42, and this behavior information 43 is transmitted after being associated with the driver assistance function information 42 and the position information 41.

The behavior information 43 of the mobile object 1 being subjected to the driver assistance function briefly represents an influence of the traveling conditions that change over time due to a road construction or a surrounding building construction or the like on the driver assistance function of the mobile object 1. According to this example, since the behavior information 43 of the mobile object 1 as described above is transmitted to the server device 2 and supplied to create the embedded information 310, the traveling conditions that change over time can be meticulously reflected in the driver assistance function.

Further, in this example, whether it is possible to travel safely by performing the driver assistance function in a position or area on the map is determined based on the information indicative of the behavior of the mobile object 1 to produce the statistical information 314.

According to this example, since the safety of the driver assistance function determined based on the behavior of the mobile object 1 is reflected in the generation of the statistical information 314 described above, the traveling conditions that change over time can be meticulously reflected in the driver assistance function from the safety point of view.

Next, an advantageous effect provided by the data creation device 210 shown in FIG. 1 and FIG. 2, the information processing method represented by the flowchart of FIG. 7, the information processing program and the storage medium will be described.

According to the data creation device 210, the information processing method, the information processing program and the storage medium of this example, statistical safety evaluation shown in FIG. 8 and FIG. 9 is performed as statistical processing based on the driver assistance function information 42 and the position information 41 acquired from each of the plurality of mobile objects 1. Then, based on the evaluation results, the embedded information 310 including the statistical information 314 corresponding to the position or area in the predefined map is created, as shown in FIG. 3 and FIG. 4. The driver assistance function information 42 and the position information 41 in the information set 47 acquired from the mobile object 1 shown in FIG. 6 represent how the driver assistance function was performed in accordance with the traveling conditions as described above. Since the embedded information 310 corresponding to the position or area on the predefined map is created from this information set 47, the traveling conditions that change over time can be reflected in the driver assistance function.

In this example, the behavior information 43 of the mobile object is further acquired together with the driver assistance function information 42 and the position information 41, and this behavior information 43 of the mobile object 1 is also included as an evaluation target in the safety evaluation as the statistical processing.

The behavior information 43 of the mobile object being subjected to the driver assistance function briefly represents an influence of the traveling conditions on the driver assistance function of the mobile object 1, as described above. According to this example, this behavior of the mobile object 1 is also supplied to create the embedded information 310, thus the traveling conditions that change over time can be meticulously reflected in the driver assistance function.

Further, in this example, the manufacturer/driver assistance function program type information 44, the mobile object type information 45 and the version information 46 are acquired together with the driver assistance function information 42 and the position information 41 and are included as the evaluation targets in the safety evaluation.

According to this example, since the respective information acquired together with the driver assistance function information 42 is also supplied to create the embedded information 310, it is possible to meticulously reflect the traveling conditions that change over time in the driver assistance function.

Further, in this example, the embedded information 310 created by the processing unit is supplied as the map data to the mobile object 1.

According to this example, since the created embedded information 310 is supplied to the mobile object 1, the traveling conditions that change over time can be effectively reflected in the driver assistance function in the mobile object 1.

Next, an advantageous effect provided by the data structure 3 of the map data shown in FIG. 3 and FIG. 4 and the storage medium and the storage device storing the map data having the data structure 3 will be described.

In the data structure 3 of this example, not only the manufacturer/driver assistance function program type information 311 of the mobile object 1, but also the driver assistance function program version information 313 is associated with the position or area on the map such as the road link 321 and the area 322. Thus, in a particular mobile object 1 referring to the map data, this map data having the data structure 3 is used to perform detailed operation such as determination of whether the driver assistance function should be performed (permitted/not permitted) while also referring to the version information 313. Thus, according to the data structure 3 of this example, it is possible to perform meticulous driver assistance function using the map data having the data structure 3.

In this example, the mobile object type information 312 is also used for the determination of whether the driver assistance function should be performed (permitted/not permitted). Consequently, further meticulous driver assistance function can be performed.

Next, an advantageous effect provided by the data structure 4 shown in FIG. 6 in the data transmitted from the mobile object 1 to the server device 2 and by the mobile object communication unit 113 for transmitting the data having the data structure 4 will be described.

According to the data structure 4 of this example, the mobile object communication unit 113 associates the driver assistance function information 42 and the position information 41 with each other and transmits them as the information set 47. The driver assistance function information 42 and the position information 41 in the mobile object 1 represent how the driver assistance function was performed in accordance with the traveling conditions, as described above. Since this information set 47 is transmitted from the mobile object 1 to the server device 2 and supplied to create the embedded information 310 corresponding to a position or area on a predefined map, the traveling conditions that change over time can be reflected in the driver assistance function.

In this example, in the information set 47, the manufacturer/driver assistance function program type information 44 and such described above is further associated with the driver assistance function information 42 and the position information 41.

According to this example, since this manufacturer/driver assistance function program type information 44 and such is also transmitted to the server device 2 and supplied to create the embedded information 310, the traveling conditions that change over time can be meticulously reflected in the driver assistance function.

Further, in this example, in the information set 47, the behavior information 43 of the mobile object 1 is further associated with the driver assistance function information 42 and the position information 41.

The behavior information 43 of the mobile object 1 being subjected to the driver assistance function briefly represents an influence of the traveling conditions on the driver assistance function of the mobile object 1. According to this example, since this behavior information 43 of the mobile object 1 is transmitted to the server device 2 and supplied to create the embedded information 310, the traveling conditions that change over time can be meticulously reflected in the driver assistance function.

The present invention is not limited to the above-described example and may include other configurations and the like that can achieve the object of present invention, and modifications and the like as described below are also included in the present invention.

For example, in the above-described example, the mobile object 1 as a passenger car is shown. However, the mobile object is not limited to a passenger car and may be a large vehicle such as a truck or a bus, and the specific type of the mobile object does not matter.

Further, in the above-described example, the information processing device 110 built in the navigation device disposed in the mobile object 1 is shown. However, the information processing device that performs the processing in the mobile object is not limited to this and may include components built in a computer that is provided separately from the navigation device.

Further, in the above-described example, the mobile object 1 transmits the information set 47 including the behavior information 43 of the mobile object 1 and the driver assistance function information 42, and the server device 2 performs the safety evaluation based on the behavior information 43 as the statistical processing. However, the behavior of the mobile object 1 may not be included in the information set from the mobile object 1, and, as the statistical processing, the server device 2 may count the number of times the same kind of driver assistance function is performed for a position or area on the map. The number of times an arbitrary driver assistance function is performed can be said to reflect how well the driver assistance function whose number is counted can be performed in a position or area where the number is counted. In this case, the statistical information associated with the position or area on the map in the map data is information and the like indicating that the driver assistance function whose number of counts exceeds a predefined threshold value is permitted to be performed.

Further, in the above-described example, the statistical information indicating whether the driving using the driver assistance function should be performed in the mobile object 1 or not, i.e., whether the driver assistance function is permitted or not permitted, is embedded in the map data in the server device 2. However, the map data created in the server device may be data embedded with statistical information indicating whether the driving using the driver assistance function should not be performed in the mobile object 1 or not, i.e., whether the driver assistance function is prohibited or not prohibited.

LIST OF REFERENCE NUMERALS

1, 1a, 1b mobile object
2 server device
3 data structure
4 data structure
5 evaluation table
6 evaluation result table
41 position information
42, 62 driver assistance function information
43 behavior information
44, 63, 311 manufacturer/driver assistance function program type information
45, 64, 312 mobile object type information
46, 65, 313 version information
47 information set
61 position or area on map
66 accumulated value of safety point
67 evaluation result
110 information processing device
111 first acquiring unit
112 second acquiring unit
113 mobile object communication unit
120 driver assistance device 130 mobile object storage device
210 data creation device
211 server communication unit
212 processing unit
213 supply unit
220 server storage device
310 embedded information
314 statistical information
320 road network
321 road link
322 area

The invention claimed is:

1. A server device configured to execute statistical processing with respect to data acquired from a communication device disposed at each of a plurality of mobile objects and embed information into map data, the server device comprising:
   an acquisition device configured to acquire, from the communication device disposed at one mobile object of the plurality of mobile objects, information to be processed in which position information of the one mobile object is associated with information indicating a driver assistance function being used by the one mobile object, the acquisition device being configured to acquire, as the information to be processed, information including at least one of information regarding a type of a program related to the driver assistance function, information regarding a version of the program or information regarding a type of the one mobile object is associated with the position information and the information indicating the driver assistance function; and
   a processor configured to:
      execute statistical processing with respect to the acquired information to be processed to obtain statistical information indicating whether the driver assistance function should be performed or not performed in a position or area in a map indicated by the map data, and
      embed, into the map data, the statistical information indicating whether the driver assistance function should be performed or not performed in the position or the area in the map indicated by the map data.

2. The server device according to claim 1, wherein the acquisition device is further configured to acquire, as the information to be processed, information in which information indicating behavior of the one mobile object is associated with the position information and the information indicating the driver assistance function.

3. The server device according to claim 2, wherein, based on the information indicating the behavior, the processor determines whether it is possible to travel safely by performing the driver assistance function or not in the position or area in the map to produce the statistical information.

4. The server device according to claim 3, further comprising a supply configured to supply the statistical information produced by the processor to a predefined mobile object.

5. The server device according to claim 2, further comprising a supply configured to supply the statistical information produced by the processor to a predefined mobile object.

6. The server device according to claim 1, further comprising a supply configured to supply the statistical information produced by the processor to a predefined mobile object.

7. The server device according to claim 1, wherein the driver assistance function assists driving operations of the mobile object, and
   the processor is configured to cause the driver assistance function to be performed at the one mobile object or to not be performed at the one mobile object, based on the statistical information embedded into the map data.

8. An information processing method for performing statistical processing with respect to data acquired from a communication device disposed at each of a plurality of mobile objects and embedding information into map data, the method comprising:
   acquiring, from the communication device disposed at one mobile object of the plurality of mobile objects, information to be processed in which position information of the one mobile object is associated with information indicating a driver assistance function being used by the one mobile object, the acquiring including acquiring, as the information to be processed, information including the information to be processed including at least one of information regarding a type of a program related to the driver assistance function, information regarding a version of the program or information regarding a type of the one mobile object is associated with the position information and the information indicating the driver assistance function; and
   executing statistical processing with respect to the acquired information to be processed to obtain statistical information indicating whether the driver assistance function should be performed or not performed in a position or area in a map indicated by the map data, and embedding, into the map data, the statistical information indicating whether the driver assistance function should be performed or not performed in the position or the area in the map indicated by the map data.

9. A non-transitory computer-readable medium on which is stored an information processing program that, when executed by a computer, causes the computer to execute the processing method of claim 8.

10. The information processing method according to claim 8, wherein the driver assistance function assists driving operations of the mobile object,
   the method further comprising causing the driver assistance function to be performed at the one mobile object or to not be performed at the one mobile object, based on the statistical information embedded into the map data.

* * * * *